United States Patent
Burmester et al.

(10) Patent No.: US 9,546,735 B2
(45) Date of Patent: Jan. 17, 2017

(54) DOUBLE-SEAT VALVE WITH A SEAT-CLEANING FUNCTION

(75) Inventors: Jens Burmester, Grambek (DE); Arne Schulz, Hamburg (DE); Matthias Südel, Ratekau (DE); Bastian Tolle, Büchen (DE)

(73) Assignee: GEA Tuchenhagen GmbH, Büchen (DE)

( * ) Notice: Subject to any disclaimer, the term of this patent is extended or adjusted under 35 U.S.C. 154(b) by 0 days.

(21) Appl. No.: 14/408,559

(22) PCT Filed: Jun. 16, 2012

(86) PCT No.: PCT/EP2012/002556
§ 371 (c)(1),
(2), (4) Date: Dec. 16, 2014

(87) PCT Pub. No.: WO2013/185790
PCT Pub. Date: Dec. 19, 2013

(65) Prior Publication Data
US 2015/0211642 A1  Jul. 30, 2015

(51) Int. Cl.
*F16K 1/44*  (2006.01)

(52) U.S. Cl.
CPC ........ *F16K 1/446* (2013.01); *Y10T 137/88038* (2015.04)

(58) Field of Classification Search
CPC ........ F16K 1/446; F16K 1/44; F16K 31/1225; F16K 25/02; F16K 1/443; F15B 15/24; Y10T 137/88038; Y10T 137/4259; Y10T 137/88046; Y10T 137/8803; Y10T 137/87121; Y10T 137/4245; Y10T 137/0424; Y10T 137/5762

(Continued)

(56) References Cited

U.S. PATENT DOCUMENTS 3,277,920 A * 10/1966 Von Arx ............... F02B 77/085
                                                                137/522
6,178,986 B1  1/2001 Burmester
(Continued)

FOREIGN PATENT DOCUMENTS

DE  10 2007 027 765 A1  12/2008
DE  10 2007 038 124 A1  2/2009
(Continued)

OTHER PUBLICATIONS

United Stated Food and Drug Administration (USFDA), "3-A Sanitary Standards for Double-Seat Mixproof Valves, No. 85-02," Mar. 17, 2011 (Reston, VA).
(Continued)

*Primary Examiner* — Michael R Reid
(74) *Attorney, Agent, or Firm* — Young Basile Hanlon & MacFarlane, P.C.

(57) ABSTRACT

A double-seat valve has a seat-cleaning function and ensures that the seat-cleaning flow is conducted into and out of the leakage hollow space with as little turbulence as possible. The valve reliably prevents a pressure-increasing direct action upon the seat regions, even in the event that the cross-sectional area of the drain bore is smaller than that of the largest pipeline that can be connected to the valve. This is achieved in that a region of extension of the deflection surface that faces away from the radially outer end of the deflection surface delimits the remaining region of the opening in its entirety and opens out from the second closing element at an end-face and radially inner end of the second closing element, facing the first closing element.

16 Claims, 9 Drawing Sheets

(58) Field of Classification Search
USPC ......... 137/614.18, 240, 614.17, 613, 614.19,
137/238, 637.2, 15.05, 312; 251/62, 63,
251/63.5, 63.6
See application file for complete search history.

(56) References Cited

U.S. PATENT DOCUMENTS

| | | |
|---|---|---|
| 7,891,376 B2 | 2/2011 | Neuhauser et al. |
| 8,459,294 B2 | 6/2013 | Burmester et al. |
| 8,739,828 B2 | 6/2014 | Neuhauser et al. |
| 2009/0008594 A1 | 1/2009 | Burmester et al. |
| 2009/0044874 A1 | 2/2009 | Burmester et al. |
| 2009/0065077 A1 | 3/2009 | Neuhauser et al. |
| 2010/0180958 A1* | 7/2010 | Burmester ............ F16K 1/446 137/238 |

FOREIGN PATENT DOCUMENTS

| | | |
|---|---|---|
| DE | 10 2010 046 137 A1 | 3/2012 |
| WO | 98/41786 A1 | 9/1998 |
| WO | 98/54494 A1 | 12/1998 |
| WO | 2007/054134 A1 | 5/2007 |
| WO | 2011/038738 A1 | 4/2011 |

OTHER PUBLICATIONS

Pentair Südmo Operating Instructions, BAA D 365it Complete PMO, Version 1.01, Double-seat valve type D 365it Complete PMO type D620, Nov. 23, 2011.

* cited by examiner

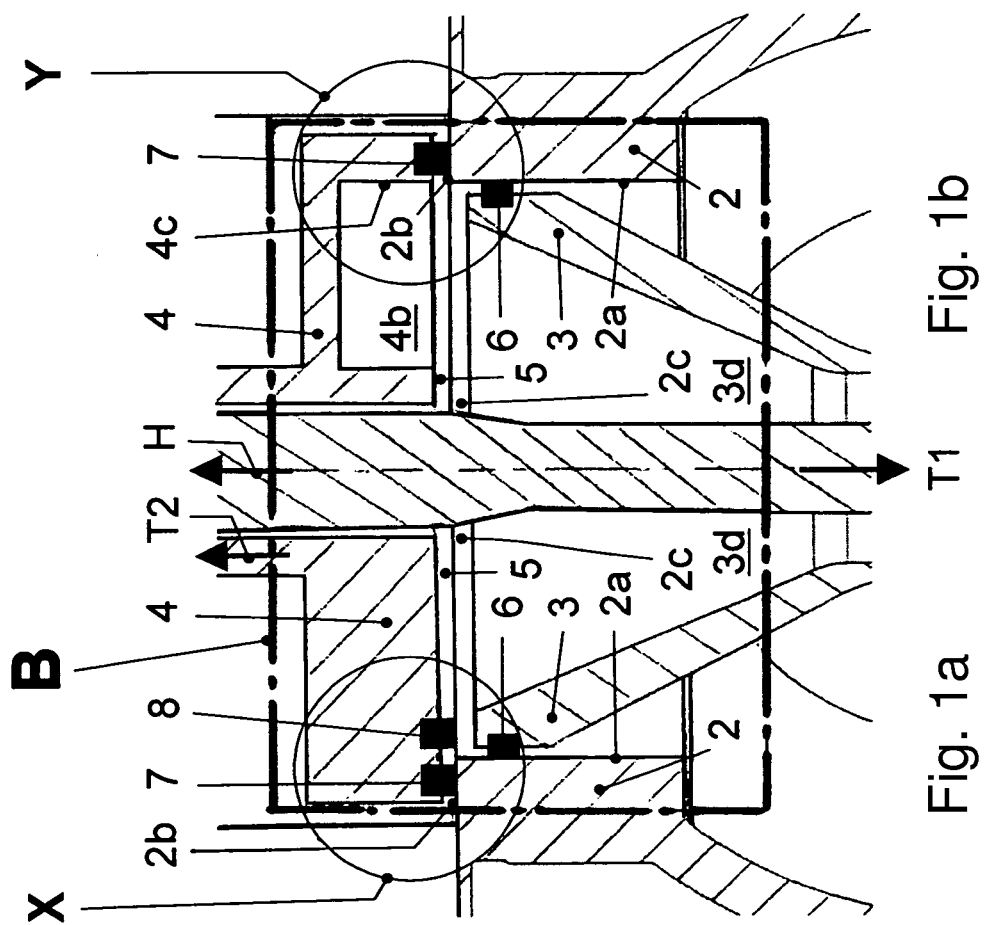

"X"

"Y"

DOUBLE-SEAT VALVE WITH A SEAT-CLEANING FUNCTION

TECHNICAL FIELD

The invention relates to a double-seat valve which has two series-arranged closing elements that are moveable relative to each other, which prevent the overflow of fluids from a valve housing part of a valve housing into another in the closed position of the double-seat valve, and which delimit a leakage hollow space between each other both in the closed as well as in the open position.

BACKGROUND

A double-seat valve with a seat-cleaning function is known from WO 2007/054131 A1 or WO 2007/054134 A1 and US 2009/0008594 A1 or respectively US 2009/0044874 A1 belonging to respective patent families.

In the double-seat valve of the initially named patent family, the independently driven—in relation to a perpendicular normal position—lower closing element, called the first closing element below, comes to rest in a sealing manner in the course of its opening movement on the dependently driven, upper closing element, called the second closing element below, via a middle seal acting between the two closing elements and also transfers the latter to an open position during the further opening movement.

In the double-seat valve of the secondly named patent family, the second closing element has on its end facing the first closing element an opening with a cylindrical circumferential wall, which is flush with a first cylindrical seating assigned to the first closing element, wherein the opening is dimensioned to receive, in a sealing manner during the opening movement, a first end section and a radial first seal of the first closing element before the second closing element opens.

In the double-seat valve of these respective patent families, the first closing element is always designed as a pusher piston with a radially acting first seal. The second closing element is designed either as a pusher piston with a radially acting second seal or as a conical seat plate with an axially/radially acting seal or as an axial seat plate with an axially acting second seal.

The known double-seat valves limit, among other things, the cleaning agent quantity during the respective seat cleaning. Their leakage outlet, which must also divert these cleaning agent quantities into the surroundings of the double-seat valve, is generally measured such that it meets the requirements or respectively regulations of the United States Food and Drug Administration (USFDA) in the "3-A Sanitary Standards for Double-Seat Mixproof Valves, Number 85-02" (hereinafter document [1]), which require among other things that the most minimal passage cross-section of the leakage outlet is to be measured such that it corresponds at least with the passage cross-section of the largest pipeline which can be connected to the double-seat valve (see document [1], requirement D14.2). Furthermore, in connection with the seat cleaning, additional requirements according to document [1] are met, which indicate that the respectively closed seat region is not directly flowed against by the respectively generated seat-cleaning flow or supplied with increasing pressure (document [1], requirement D14.5.2.1) and that the pressure in the closed seat region facing the leakage hollow space must be equal to or less than the atmospheric pressure (document [1], requirement D14.5.2.2).

The known double-seat valves thus also meet further implicit requirements of the aforementioned standards according to document [1], namely those that no cleaning agent may pass through in the case of larger seal defects or even the loss of one of the two seat seals in the course of the seat cleaning of the other closing element via the respective seal defect or respectively the seat region without seat seal. Under these conditions, the known double-seat valves not only meet the requirements for a delimitation of the cleaning agent quantity and avoidance of direct action upon the seat regions in the course of the seat cleaning, but also the requirement for the most turbulence-free possible removal of the seat cleaning flow first into the leakage hollow space and from there into the surroundings, without the respectively closed seat region being flowed against directly or supplied with increasing pressure.

Direct action is understood as any velocity component from the respective seat-cleaning flow directed perpendicularly at the walls delimiting the seat region. It has been shown that any related direct action leads to a conversion of kinetic flow energy into static pressure. Depending on the angle of impact of the flow towards the flowed against wall or body surface, a branching flow with a so-called "branching flow line" results, wherein the later divides the flow into two halves. The branching flow line itself accumulates at the so-called "stagnation point" so that the velocity is equal to zero at this point. The pressure increase as a result of this slowing of the velocity is also called "stagnation pressure." The pressure-increasing mechanisms shown above generate, if effective, a leakage flow over the respective restriction gap and the defective or the no longer present seat seal.

While the double-seat valves according to the above publications meet the requirements of document [1] solely with flow-mechanical means and modes of action on the components of the double-seat valve bordering the leakage hollow space, DE 10 2007 038 124 A1 or US 2009/0065077 A1 suggests meeting the requirements of document [1] through a separate third element arranged between both closing elements of the double-seat valve and moveable relative to both, a so-called flow barrier element. This flow barrier element shields the at least one sealing element and/or the closing element seat of the other closing element during the venting of the one closing element and during pressurization of the leakage hollow space with cleaning agent, which is located in its closed position, from a direct inflow through the cleaning agent entering the leakage hollow space. According to the description in the latter documents, "shielding" is to be understood in that the sealing element of the respective closing element located in the closed position is not pressurized directly and thus with a high flow velocity by the cleaning agent, wherein it is permitted that the cleaning agent makes its way mainly depressurized and with a low flow velocity into the area of the closing element seat or of the sealing element of the closing element located in the closed position, so that stagnation pressure cannot build up there. According to the description, the flow barrier element does not need to be completely sealed on the housing side; rather, it is preferably spaced from the housing by a small gap. Furthermore, it can be seen in FIGS. 1, 4, 7 and 12 to 15 of DE 10 2007 038 124 A1 or US 2009/0065077 A1 that the leakage hollow space meets the requirement D14.2 of document [1], namely that the most minimal passage cross-section of the leakage outlet is at least equal to the passage cross-section of the largest pipeline which can be connected to the double-seat valve.

An independent third element moveable relative to the two closing elements of a double-seat valve with a seat-cleaning function and guided in a sealing manner in the cylindrical seating for the first closing element is described in WO 98/41786 A1 (page 11, line 24 to page 12, line 9) or U.S. Pat. No. 6,178,986 B1 (column 6, line 58 to column 7, line 11). This embodiment differs from that described in the later published DE 10 2007 038 124 A1 or US 2009/0065077 A1 mainly in the interaction between the third element, the flow barrier element and the associated cylindrical seating for the first closing element. While the older solution provides a seal by means of a radially acting seal in sliding engagement, the third element in the newer solution does not need to be completely sealed on the housing side; rather, it is preferably spaced from the housing by a small radial gap.

It remains to be seen whether the flow barrier element according to DE 10 2007 038 124 A1 or respectively US 2009/0065077 A1 through its "shielding" effect in its embodiment that does not have to be sealed on the housing side or in its sealed embodiment according to WO 98/41786 A1 or respectively U.S. Pat. No. 6,178,986 B1 meets the aforementioned requirement D14.5.2.1 of document [1] and, in the case the corresponding dimensioning of the leakage outlet, also requirement D14.2. Requirement D14.5.2.2 is apparently not met as the flow barrier element now appears within the double-seat valve with a seat-cleaning function in question in a significantly modified embodiment as published in company publication Pentair Südmo Operating Instructions, BAA D 365it Complete PMO, Version 1.01, Double-seat valve type D 365it Complete PMO type D620, published November 2011 (201111) at http://www.suedmo.de/resources/images/790 (hereinafter document [2]).

A flow barrier element designed as an annular body is described in DE 10 2010 046 137 A1, which was published after document [2]. In the ventilation position of at least one of the closing elements, the annular body divides the leakage space into a first leakage space section and a second leakage space section. The annular body is designed such that cleaning agent generated in the respective seat-cleaning position can pass through the annular body from the first leakage space section into the second leakage space section. This passing takes place such that the pressure in the second leakage space section is reduced with respect to the pressure in the first leakage space section and the cleaning agent goes from the second leakage space section to the leakage outlet. Besides the function of the shielding of the seal or respectively of the cleaning member seating of the closing element located in its closed position, the annular body thus also takes on the function of the restriction of the respective seat-cleaning flow. However, this restriction is only possible and sufficient if the annular body is always sealed sufficiently on the housing side and abuts in a sealed manner against the ventilated closing element in the necessary manner.

Through this embodiment, it is possible, as illustrated for example on pages 14 and 25 of document [2] and FIG. 1 of DE 10 2010 046 137 A1 with the first closing element and the pipe shaft connected with it in mind, to reduce significantly the leakage outlet designed in the pipe shaft with respect to the subject matter of DE 10 2007 038 124 A1 or US 2009/0065077 A1 and thus differently from requirement D14.2 of document [1]. This deviating design of the double-seat valve is possible through the exemption clause at D14.2.1.1 of document [1], which states that a leakage outlet reduced with respect to requirement D14.2 is permissible if data is available proving that the maximum pressure between the valve seatings of the double-seat valve is less than or equal to the maximum pressure in a connection line provided with an unreduced leakage outlet between a shutoff valve and a shuttle valve of a comparable arrangement, which is called a "block and bleed" arrangement in document [1].

The double-seat valve according to document [2] or DE 10 2010 046 137 A1 has the noteworthy advantage that the valve housing can be designed one to two nominal widths smaller than the design with a leakage outlet that is not reduced in cross-section and thus in a considerably more cost-effective manner. This is possible because, in the open position of the double-seat valve in which the pipe shaft penetrates the connection opening between the valve housing parts, the passage cross-section of the annular gap between the pipe shaft and the connection opening, which must correspond with the passage cross-section of the largest pipeline which can be connected to the valve housing, can be realized without the above nominal width increase.

However, the double-seat valve according to document [2] or DE 10 2010 046 137 A1 has a big disadvantage in that the third member in the shape of a flow barrier element sealed on the housing side in connection with the other characteristics of its arrangement in the leakage hollow space and integration into the closing element configuration causes a complicated and thus failure-prone structural construction of the double-seat valve. This additional built-in part in the leakage hollow space with additionally necessary sealing means, corners and dead spaces is also generally difficult to clean in the flow and is thus questionable from a hygienic point of view in the proper area of application. A sufficient restriction of the respective seat-cleaning flow is also only ensured when this seat-cleaning flow passes the systematically provided restriction points in the flow barrier element and does not pass in a more or less unrestricted manner in the bypass in the form-fitting connection between the latter and the closing element located in its seat-cleaning position.

BRIEF SUMMARY

For the above reasons, a solution to realize the exemption clause D14.2.1.1 and requirement D14.5.2.2 of the document [1] without additional built-in parts in the leakage hollow space of a double-seat valve with a seat-cleaning function, and namely with purely flow-mechanical means and modes of action on the components available so far bordering the leakage hollow space, is sought.

According to the teachings herein, a double-seat valve with a seat-cleaning function is developed so as to meet objectives that the seat-cleaning flow is conducted into and out of the leakage hollow space with as little turbulence as possible and that a pressure-increasing direct action upon the seat regions is reliably prevented, even in the event that the cross-sectional area of the drain bore is smaller than that of the largest pipeline which can be connected to the double seat valve.

The double-seat valve with a seat-cleaning function according to an embodiment of the invention is based either on the basic first closing-element configuration, as in the known double-seat valve according to WO 2007/054131 A1, or on the basic second closing-element configuration, as known from WO 2007/054134 A1. In both known double-seat valves, a cylindrical appendage for the formation of the respective restriction gap is always arranged on the leakage-hollow-space-side on the respective closing element in relation to the assigned seal. In contrast, the present invention forgoes this limitation and also permits an arrangement of the respective restriction gap on the side of the seal facing away from the leakage hollow space. Moreover, the double-seat valve described herein uses half the diameter difference of these cylindrical appendages, which permits the formation of a transition surface between the diameter-different sections of a connection opening interconnecting the valve housing parts of a valve housing, wherein the sections are assigned to the cylindrical appendages. Furthermore, the closing elements can be transferred independently of each other through a partial lift respectively gap-wide into a seat-cleaning position for the purpose of the rinsing of their seatings. A seat-cleaning flow generated in the respective seat-cleaning position experiences the required restriction in the restriction gap arranged on the associated closing element before it enters the leakage hollow space arranged between the closing elements. Finally, in the case of the two known double-seat valves, the first seat-cleaning flow generated by the first closing element on a rotationally symmetrical deflection surface, which is formed in an opening in the second closing element, experiences a shock-free deflection directed into a drain bore, wherein the drain bore is delimited by a pipe shaft designed on the first closing element led out of the valve housing.

The double-seat valve with a seat-cleaning function according to an embodiment of the present invention has two series-arranged closing elements that are moveable relative to each other, which in the closed position of the double-seat valve prevent the overflow of fluids from one valve housing part of a valve housing into another and which delimit a leakage hollow space between each other both in the closed as well as in the open position. The leakage hollow space is connected with the surroundings of the double-seat valve via a drain bore, which is delimited by a pipe shaft designed on the first closing element led out of the valve housing. In the closed position, the first closing element designed as a pusher piston is received in a sealing manner in a connection opening interconnecting the valve housing parts and forming a cylindrical first seating. In the course of its opening movement, the first closing element comes to rest in a sealing manner on or in a second closing element, which is assigned to a second seating and also transfers the latter to an open position during the further opening movement. The two closing elements can be transferred independently of each other through a partial lift respectively gap-wide into a seat-cleaning position for the purpose of rinsing their seatings. The second closing element can be transferred into its respective seat-cleaning position through a second partial lift rectified with the opening movement and the first closing element can be transferred into its respective seat-cleaning position through a first partial lift opposing the opening movement. The first closing element has on its first end section a first seal, which seals up radially with respect to the cylindrical first seating. The second closing element has on its second end section facing the first closing element a rotationally symmetrical opening, which in the closed position of the double-seat valve connects to the cylindrical first seating on the radial outside flush with the diameter. The opening is delimited at least in sections by a deflection surface, the contour of which, seen in a meridian cut, has a kink-free progression. The radially outer end of the deflection surface ends directly or indirectly in the end-face delimitation surface of the second end section. Each end section forms an annular restriction gap in the assigned seat-cleaning position on the radial outside with the assigned connection opening. The first seating has a diameter that is smaller than the diameter of an annular opening assigned to the second closing element in the connection opening, and a transition surface is provided between the first seating and the annular opening. The second closing member lies in its closed position with a stop surface arranged on an end surface of its second end section against the transition surface, namely directly adjacent to the first seating.

The double-seat valve with a seat-cleaning function according to the invention can be realized in the aforementioned two basic closing-element configurations. In the first closing-element configuration, the first closing element comes to rest in a sealing manner in the course of its opening movement on the second closing element via a middle seal acting between the closing elements. In the second closing-element configuration, the first closing element moves into the second closing element and comes to rest in a sealing manner in the course of entry in the second closing element. This is achieved in that the opening has a mainly cylindrical circumferential wall flush with the cylindrical first seating on its radially outer outlet point from the second end section, wherein the later transitions into the deflection surface, and the opening is dimensioned in order to receive in a sealing manner the first end section and the radial first seal of the first closing element during the opening movement, before the second closing element opens.

In order to meet the objectives described above, the first seat-cleaning flow is forced through the deflection surface radially inward and axially to the first closing element up until the exit of the second closing element on an end-face and radially inner end of the second closing element located outside the opening. This succeeds in that the deflection surface with a region of extension facing away from its radially outer end delimits the remaining region of the opening in its entirety and opens out from the latter at an end-face and radially inner end of the second closing element facing the first closing element.

Within the framework of the above general tenet, an advantageous embodiment suggests that the end-face and radially inner end of the second closing element is located within an imaginary space, which is delimited on the end-face side by a plane passing through the stop surface, or is arranged in this plane. Another embodiment provides that the end-face and radially inner end of the second closing element, seen in the longitudinal axis of the double-seat valve, protrudes over the imaginary space, which is delimited on the end-face side by a plane passing through the stop surface.

Through this advantageous embodiment, the forced guidance of the first seat-cleaning flow up to into the inlet of the drain bore is maintained. This particularly long and even more far-reaching deflection and forced guidance of the first seat-cleaning flow lead to an even further improved fulfilling of the requirements of document [1]. Moreover, through this treatment of the first seat-cleaning flow, in contrast to the above-described double-seat valves, the second seat-cleaning flow also experiences for the first time a deflection directed into the drain bore. If the first seat-cleaning flow is deflected and forced even further into the drain bore, then the second seat-cleaning flow also experiences, besides the above deflection, additionally a forced guidance up into the inlet of the drain bore.

The first seat-cleaning flow, the treatment of which in the leakage hollow space is at the outset harder and more problematic than that of the second seat-cleaning flow, is now deflected and forced very far radially inwards and simultaneously axially to the first closing element. It no longer opens out from an end surface of the opening in the second closing element, but rather from an end surface of the second closing element itself located outside the opening. It is thereby advantageous if the deflection and forced guidance takes place in a radially and axially far-reaching manner, namely up to an outermost end delimiting the second closing element. In the two known double-seat valves described above, the first seat-cleaning flow was only deflected and forced up to the outlet of the deflection surface out of the end surface of the opening in the second closing element, i.e., on a relatively short flow path.

The treatment of the first seat-cleaning flow executable with the double-seat valve with a seat-cleaning function according to the invention has, in connection with its sufficient restriction, the surprising effect that the objectives above are met in full, in particular under the conditions of a reduced leakage outlet. An accumulation of the first seat-cleaning flow in the leakage outlet, which can be formed by the succession of several sections of a drain bore in the pipe shaft, does not take place in any of these sections; rather the respective passage cross-section of the drain bore is not completely filled at any point so that the atmospheric pressure can reach up to in to the leakage hollow space. An impermissible formation of excess pressure in relation to the atmospheric pressure thus cannot take place in the leakage hollow space. The same goes for the second seat-cleaning flow, which from the outset is easier to manage than the first seat-cleaning flow due to its even more effective ejector effect in the leakage hollow space.

The double-seat valve with a seat-cleaning function according to the invention thus contrasts with the known double-seat valve of the type described above, in which the leakage outlet is not reduced with respect to the passage cross-section of the largest pipeline which can be connected to the double-seat valve.

Since the end position delimitation of the second closing element takes place at the stop surface in the area of the transition surface and thus the fixed (metallic) stop surface necessary up to now in the seat region of the second closing element or elsewhere is omitted, there is now more freedom for designing the sealing geometry of the second closing element and the related modes of action in this seat region as compared to known solutions. In principle, a purely radially, radially/axially and also a purely axially acting second seal can be provided in this area.

In this connection, the invention provides according to a first design that the second seating is designed cylindrically and is formed by the annular opening and that the second closing element has a second seal, which seals up radially with respect to the second seating in sliding engagement.

A second design concerning the second seating provides that the second seating is designed in a conical manner and is formed by the transition surface or by a surface connecting to the annular opening on the side opposite the transition surface, i.e., upwards in the case of a perpendicular normal position, and that the second closing element has a second seal, which seals up axially/radially with respect to the second seating in sliding/pressing engagement.

According to a third design, it is suggested that the second seating is arranged perpendicular to the longitudinal axis of the double-seat valve and is formed by the transition surface or by a surface connecting to the annular opening on the side opposite the transition surface, i.e., upwards in the case of a perpendicular normal position, and that the second closing element has a second seal, which seals up axially with respect to the second seating in pressing engagement.

The two last-named solutions with the advantages of an axially/radially or a purely radially acting seal and of a correspondingly designed seat plate are, however, only possible if the respective seal is provided in a ductile manner such that the fixed and, if applicable, metallic arrangement of the second closing element with its stop surface is ensured alone at the transition surface under all conditions.

The double-seat valve with a seat-cleaning function according to the invention ensures in a preferred embodiment that the valve housing parts are designed according to the largest nominal passage cross-section of a pipeline which can be connected to the latter and are interconnected via a seat ring forming the connection opening on the inside. A connecting element of the pipe shaft, which forms a section of the drain bore on the inside, penetrates during a full opening stroke of the double-seat valve at least the connection opening and is dimensioned on the radial outside such that the connection opening at its narrowest point forms an annular space with an annular-space passage cross-section, which corresponds at least with the aforementioned largest nominal passage cross-section. This measurement rule inevitably ensures that the annular-space passage cross-section does not form a narrowing with respect to the nominal passage cross-section of the connectable pipeline at any point. Since the nominal width of the valve housing parts is determined by the pipeline to be connected and is thus not oversized from the outset by one or two nominal widths, the outer diameter of the connecting element and thus the radially inner section of the drain bore are to be measured and reduced such that the annular-space passage cross-section is realized in the required size.

In an advantageous manner, the connecting element, which remains restricted to the necessary linear dimension with its cross-sectionally reducing and thus generating a generally undesired flow resistance effect, is designed such that the drain bore tapers from the leakage-hollow-space-side end of the first closing element in an inlet funnel in a conical manner and continuously up to the connecting element and has in the latter on a restricted length a minimum, preferably unchanged, drain cross-section.

In order to reduce the flow resistance of the drain bore, according to a further suggestion, it is expanded subsequent to the connecting element in a section of the pipe shaft designed as the first pressure compensating piston, wherein the pressure compensating piston has an outer diameter corresponding with the diameter of the cylindrical first seating or differing from it slightly to both sides.

In order to avoid an unplanned accumulation of the seat-cleaning flows in front of the narrowest passage cross-section of the drain bore, the connecting element, the inlet funnel with a volume of liquid accumulating in it, if applicable, forms a fill level, the hydrostatic pressure of which is sufficient to convey the volume flow of liquid generated in the respective seat-cleaning position at least through the minimum drain cross-section of the connecting element. The connecting element, seen in the gravitational direction, connects to the fill level.

In the case of double-seat valves with a seat-cleaning function of the known type with an unproblematically sized passage cross-section of the drain bore, a sufficient restriction of the seat-cleaning flows, in whatever manner, is required and known. In the case of the double-seat valve with a seat-cleaning function according to the invention with a clearly reduced passage cross-section of the drain bore at least in sections, sufficient restriction is all the more mandatory and requires special and non-notorious measures. So that the unplanned scenario described above of an accumulation of the seat-cleaning flows in the narrowest passage cross-section of the drain bore cannot occur, the respective volume flows of liquid generated by the seat-cleaning flows are restricted such that the volume flows without backing up in the drain bore flow through the latter into the surroundings of the double-seat valve.

Different operational demands of the seals of the two closing elements and different mounting and guiding conditions of the closing elements permit, as provided in one suggestion, that a radial second gap width of the second restriction gap is designed smaller than a radial first gap width of the first restriction gap. This has a positive impact on the sized coordination of the volume flows generated by the restriction gap, as a smaller gap length is available structurally on the second restriction gap than on the first restriction gap, wherein, as is known, the gap length impacts the restriction only linearly and the radial gap width impacts it exponentially. It has proven to be advantageous and productive if the relative radial gap widths of the first and second restriction gap remain close to 2:1, wherein the relative radial gap width is to be understood as the ratio between the absolute radial gap width and the average diameter on which the restriction gap is arranged.

With regard to the same drain conditions of the seat-cleaning flows in the drain bore, it is advantageous if the annular restriction gaps with their radial gap width and an associated length are designed such that the volume flows of liquid generated in the respective seat-cleaning positions with the partial lifts by the associated seat-cleaning flows are equal.

The volume flow of liquid of the respective seat-cleaning flow is restricted and/or deflected and guided by the measures suggested above such that, as a result of the ejector effect of the respective seat-cleaning flow, the pressure at the leakage-hollow-space-side section of the seating of the respective other closing element remaining in its closed position is equal to or less than the ambient pressure of the double-seat valve, the atmospheric pressure. With the exception of the sameness of the pressures in question, this means that the respectively closed valve seat is suctioned such that a transfer of cleaning liquid into the product is excluded even in the case of a seriously damaged or completely missing seat seal. The volume flow of the first seat-cleaning flow is thereby the limiting variable for the suggested restriction, since the first seat-cleaning flow is the most problematic and most difficult to handle. This results from the fact that the first seat-cleaning flow flows over the overlay gap between the second closing element located in its closed position and an associated stop surface on the valve housing directly and diagonal to the overlay gap, so that in this area of the ejector effect of the first seat-cleaning flow generally generating negative pressure, a stagnation pressure generating excess pressure can overlay. The ejector effect of the second seat-cleaning flow generating negative pressure is, in contrast, mainly free of stagnation-pressure-forming overlays.

In the case of the flow guidance of the second seat-cleaning flow generated by the ventilation of the second closing element, it is important that it detaches in a defined manner at a first circumferential edge formed by the transition surface and the first seating and passes securely tangentially and radially inwards at the surfaces bordering the first closing element in the area of the leakage hollow space. For this purpose, an end-face side delimitation of the first closing element facing the leakage hollow space has an axial safety distance from the transition surface, which prevents a related production-oriented impact under all possible production-oriented conditions and also ensures an optimal ejector effect of the second seat-cleaning flow in the seat region of the first closing element. It has also proven beneficial in terms of an avoidance of any stagnation pressure formation if the first circumferential edge is rounded with the smallest possible first corner rounding. Ideally, a sharp-edged design would be provided here, which is however not practical for production-oriented and other reasons (risk to the first seal).

According to a further suggestion, the annular opening in the housing forms a perpendicular deflection angle (90 degrees) with the transition surface, which ensures most closely a secure, collision-free overflowing of the first closing element by the second seat-cleaning flow. The transition between the opening and the transition surface is thereby advantageously rounded with a corner radius. As is also provided, an obtuse deflection angle (>90 degrees) can also be designed, wherein it directs the second seat-cleaning flow into the drain bore in a more targeted manner, but can have a stagnation-pressure-forming effect with respect to the first seat-cleaning flow, because the flow direction of the first seat-cleaning flow then matches a directional component of the transition surface.

In order to avoid the formation of stagnation pressure during the entry of the first seat-cleaning flow into the deflection surface in the second closing element, a further suggestion provides that the circumferential wall with the stop surface forms a second circumferential edge, which is rounded with a smallest possible second corner rounding. A sharp-edged transition in this area is not used for production-oriented and practical reasons; in contrast, a relatively large corner radius is counterproductive and leads to the undesired formation of stagnation pressure.

In terms of an optimal flow guidance of the first seat-cleaning flow, the contour of the deflection surface consists of a sequence of curved sections, which have respectively a common tangent at their transition points.

In order to avoid turbulence and stagnation pressure formation not only in the area of the aforementioned seatings of the double-seat valve, it is advantageous if all built-in parts and obstructions in the remaining leakage hollow space are foregone, if structurally possible. In this regard, one suggestion thus provides that a first adjusting rod connected with the first closing element penetrates concentrically a second adjusting rod connected with the second closing element and designed as a hollow rod, continues cantilevered through the drain bore and is permanently connected with the first closing element via at least one traverse oriented mainly radially on an end of the first closing element facing away from the second closing element. The braces and other connecting means otherwise normal in the area of the leakage hollow space are thereby avoided and displaced towards an end located relatively far from the leakage hollow space, where they can no longer have disruptive impacts on the flow guidance.

In order to reduce the flow resistance in particular in the cross-sectionally-reduced area of the drain bore, a further suggestion provides that the first adjusting rod is reduced in its cross-section at least in the axial region of extension of the connecting element, namely to a cross-sectionally-reduced valve rod area.

A sufficient restriction of the seat-cleaning flows is a necessary prerequisite for reaching the objectives described above. In order to enlarge the restriction effect of the restriction gap beyond the dimension reachable with dimensioning measures for the radial gap width and the length or to achieve the same restriction effect with a larger radial gap width and/or a shorter gap length, a further suggestion provides, wherein a turbulent flow is assumed in the respective restriction gap, that the cylindrical appendage is designed, on its circumferential surface delimiting the associated restriction gap, in the form of a labyrinth seal, the flow-mechanical effect of which is generally known. This can be achieved in that the labyrinth seal is designed in the form of a number of circumferential grooves. Another embodiment provides that the labyrinth seal is designed in the form of a number of openings that are distributed over the circumferential surface of the cylindrical appendage, which are delimited at the respective location of their formation and which are not interconnected.

BRIEF DESCRIPTION OF THE DRAWINGS

A more detailed representation of the invention results from the following description and the included figures of the drawing as well as from the claims. While the invention is realized in a plurality of embodiments of two mainly differing closing-element configurations of a double-seat valve with a seat-cleaning function, three preferred embodiments of these two closing-element configurations are described based on the drawing.

FIG. 1a is a detailed view of the area B located left of the longitudinal axis of the double-seat valve according to FIG. 1 with a middle seal between the two closing elements, wherein the first closing element in the course of its opening movement comes to rest in a sealing manner on the second closing element via the middle seal;

FIG. 1b is a detailed view of the area B located right of the longitudinal axis of the double-seat valve according to FIG. 1, wherein the second closing element has on its second end section facing the first closing element a rotationally symmetrical opening with a cylindrical circumferential wall that is flush with the cylindrical first seating and the opening is dimensioned in order to receive in a sealing manner the first closing element during the opening movement before the second closing element opens;

FIGS. 1c to 1g are schematic views of potential embodiments of the first closing-element configuration shown in FIG. 1a with middle seal, wherein the view are limited to the selection area labeled with the letter "X" in FIG. 1a;

DETAILED DESCRIPTION

Figure 1:
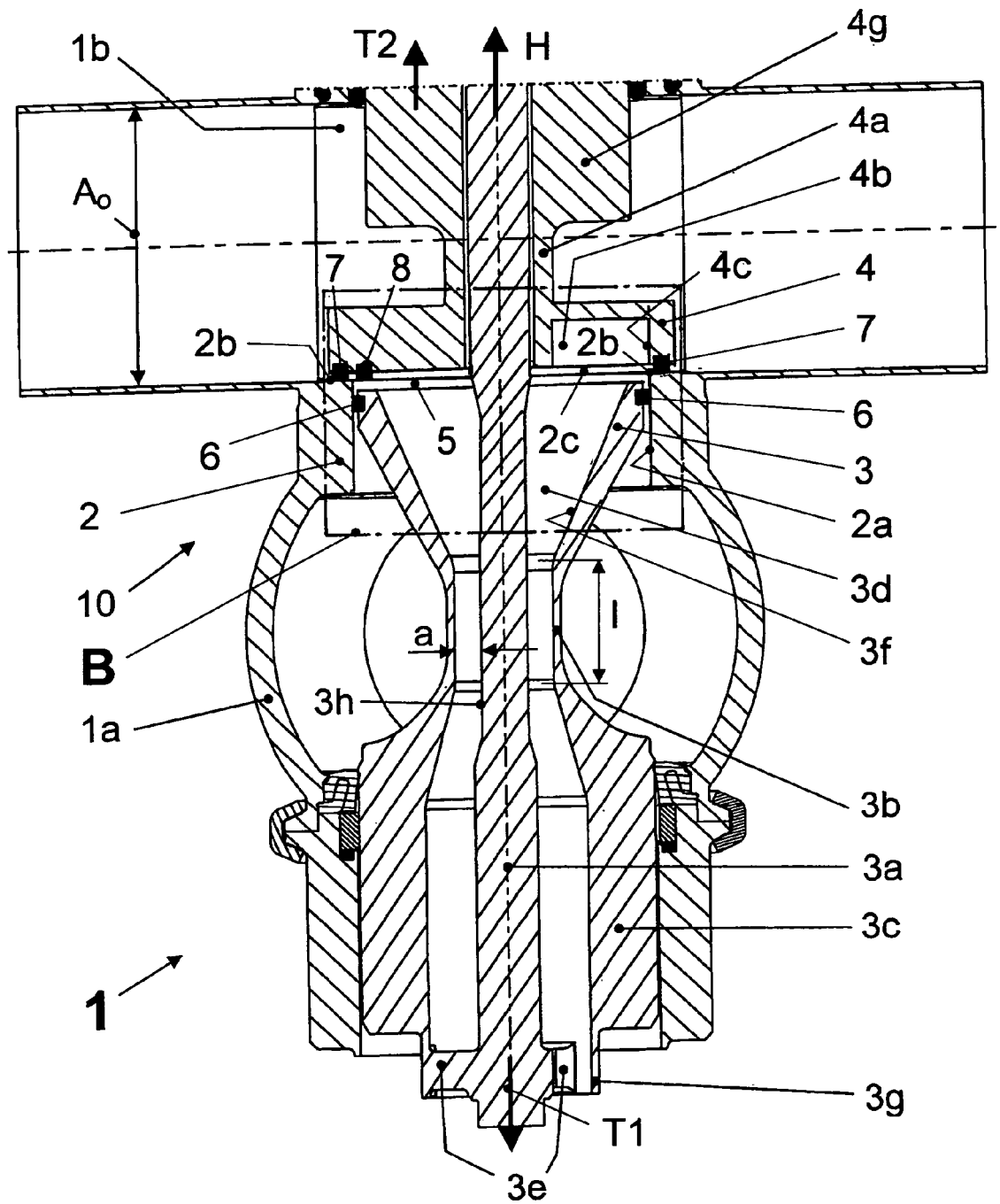
FIG. 1 is a meridian cut view of the basic structure of a double-seat valve with a seat-cleaning function according to an embodiment of the invention without a drive, namely outside an area labeled with the letter "B", wherein the closed position of the double-seat valve is shown and two basically differing closing-element configurations are shown only schematically in the area B.

The double-seat valve 1 with a seat-cleaning function according to the invention (FIGS. 1, 1a to 1k) consists mainly of the valve housing 10 with a first and a second valve housing part 1a, 1b, the two independently moveable closing elements 3 and 4 with the respectively associated adjusting rods 3a, 4a and a seat ring 2, which establishes a connection between the valve housing parts 1a, 1b via an inside connection opening 2c.

Figure 6:
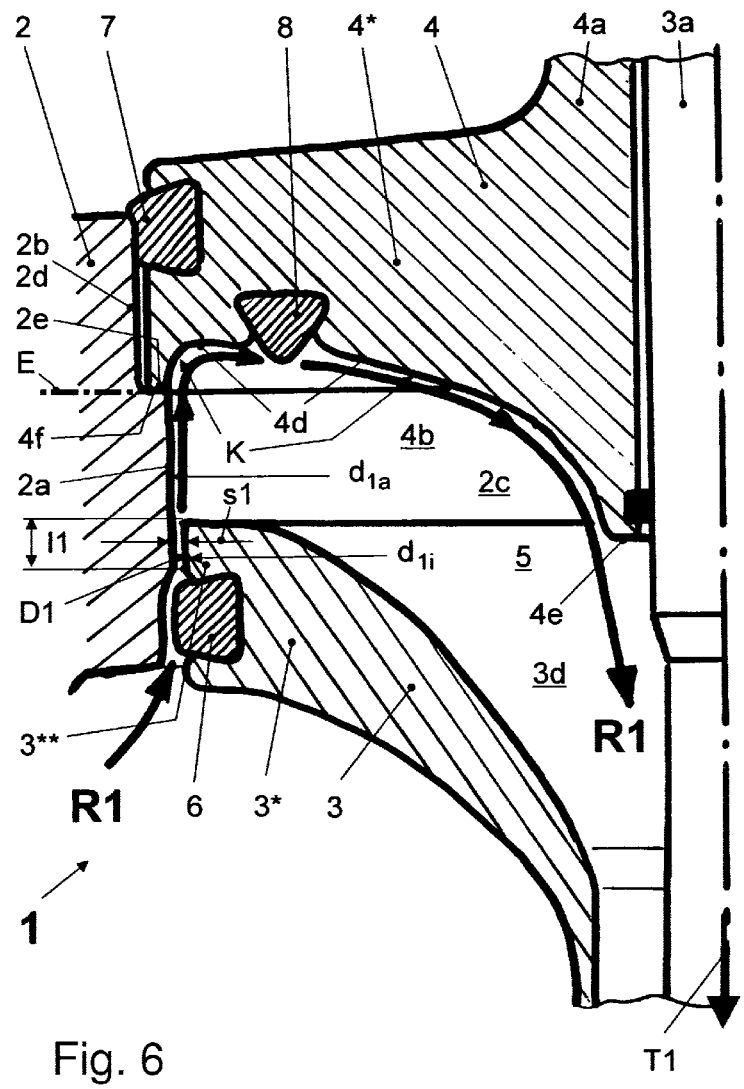
FIG. 6 is a meridian cut view of the double-seat valve according to FIG. 2, wherein the first closing element designed as a pusher piston is located in its seat-cleaning position and the progression of the first seat-cleaning flow is shown.

The first closing element 3 (independently driven, active closing element) designed as a pusher piston is received in a sealing manner in the closed position of the double-seat valve 1 in a first seating 2a formed by the connection opening 2c, which is designed as a cylindrical seating (FIGS. 1, 1a to 1k, 2 to 4, 7). For this, a first seal 6 is provided in the pusher piston 3, which acts together with the first seating 2a exclusively through radial pre-tensioning (radial seal in sliding engagement). The second closing element 4 (dependently driven, passive closing element) works together in a sealing manner with a second seating 2b in the closed position of the double-seat valve 1 (FIGS. 1, 1a, 1b), which can be designed cylindrically (FIGS. 1c, 2, 6), conically (FIGS. 1d, 1e, 1h, 1i) or perpendicularly to the longitudinal axis of the double-seat valve 1 (FIGS. 1f, 1g, 1j, 1k, 3, 4).

In the cylindrical design of the valve seating, the second seating 2b is formed by a mainly cylindrical annular opening 2d in the connection opening 2c. The sealing takes place via a second seal 7, which works together with the second seating 2b exclusively through radial pre-tensioning (radial seal in sliding engagement).

Figure 1C:
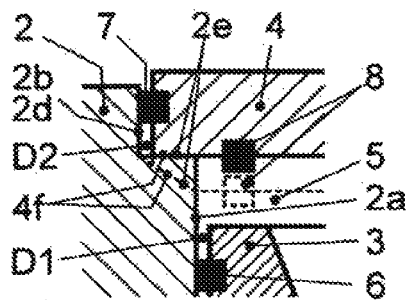
Figure 1D:
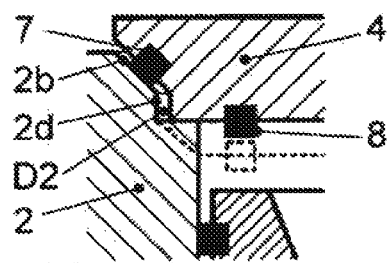
Figure 1E:
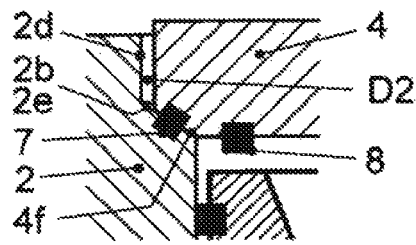
Figure 1F:
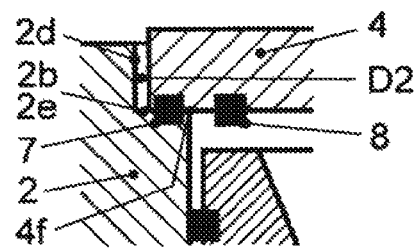
Figure 1G:
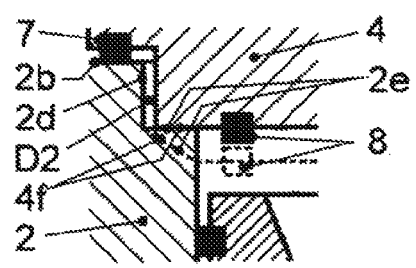
Figure 1H:
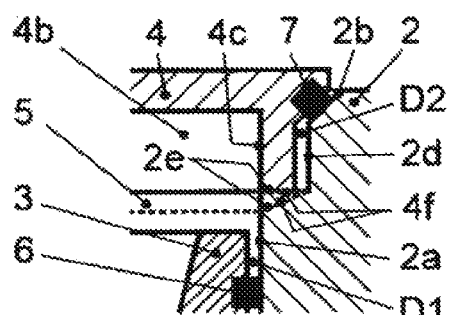
FIGS. 1h to 1k are schematic views of potential embodiments of the second closing-element configuration shown in FIG. 1b with the opening in the second closing element, wherein the views are limited to the selection area labeled with the letter "Y" in FIG. 1b.
Figure 1I:
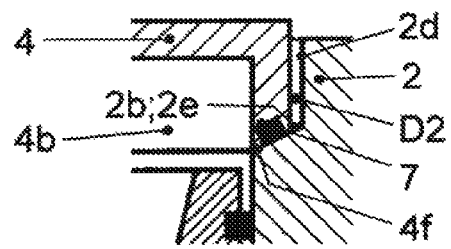

In the conical design of the valve seating, the second seating 2b is formed by a transition surface 2e (FIGS. 1e, 1i) or by a surface connecting upwards to the cylindrical annular opening 2d (FIGS. 1d, 1h). The sealing takes place via the second seal 7, which seals up axially/radially with respect to the second seating 2b in sliding/pressing engagement.

Figure 1J:
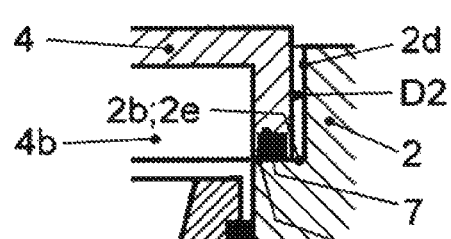
Figure 1K:
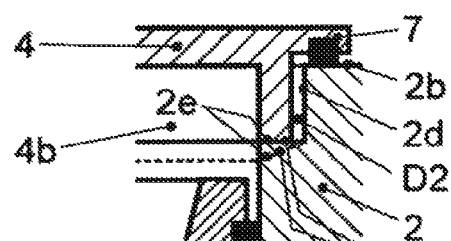

In the design of the valve seating perpendicular to the longitudinal axis of the double-seat valve 1, the second seating 2b is formed by the transition surface 2e (FIGS. 1f, 1j, 3, 4) or by a surface connecting upwards to the cylindrical, annular opening 2d (FIGS. 1g, 1k). The second seal 7 seals up axially with respect to the second seating 2b in pressing engagement. This solution is then realizable when the axially acting second seal 7 is ductile enough that the stop position of the second closing element 4 continues to be ensured on the valve-housing-side transition surface 2e, in the area exiting into the area of the first seating 2a.

The two closing elements 3, 4 form both in the respectively represented closed (FIGS. 1 to 4, 6, 7) as well as in an open position (FIG. 5 from FIG. 1c) amongst themselves a leakage hollow space 5, which is connected with the surroundings of the double-seat valve 1 via a drain bore 3d. The drain bore 3d is delimited by a pipe shaft formed on the first closing element 3 and led out of the first valve-housing part 1a into the surroundings of the double-seat valve 1 (see in particular FIGS. 1, 2). The drain bore 3d is delimited overall on the radial outside, beginning from the leakage hollow space 5, by an inlet funnel 3f, a subsequent connecting element 3b and a pressure compensating piston 3c continuing on the latter, wherein the latter preferably has an outer diameter corresponding or almost corresponding with the first seating 2a. The drain bore 3d penetrates the pipe shaft preferably concentrically, and it tapers from the leakage-hollow-space-side end of the first closing element 3 in the inlet funnel 3f in a conical manner and continuously up to the connecting element 3b and has in the latter on a delimited length l an unchanged, minimum drain cross-section a.

The valve housing parts 1a, 1b are designed according to the largest nominal passage cross section $A_O$ of a pipeline which can be connected to the valve housing 10 (FIG. 1) and are interconnected via the seat ring 2 forming the connection opening 2c on the inside. The connecting element 3b of the pipe shaft, which forms a section of the drain bore 3d on the inside, penetrates at least the connection opening 2c during a full opening stroke H of the double-seat valve 1 (FIGS. 5, 1) and is dimensioned there on the radial outside such that the connection opening 2c forms, at its narrowest point, an annular space with an annular-space passage cross-section $A_R$, which corresponds at least with the nominal passage cross-section $A_O$ ($A_R \geq A_O$).

The first connecting rod 3a connected with the first closing element 3 penetrates concentrically the second adjusting rod 4a which is connected with the second closing element 4, designed as a hollow rod and designed in the penetration area with the second valve housing part 1b as second pressure compensating piston 4g (FIG. 1), continues cantilevered through the drain bore 3d and is permanently connected with the first closing element, which is designed as ring 3g, via at least one mainly radially oriented traverse 3e on an end of the first closing element 3 facing the second closing element 4. In order to reduce the flow resistance in the drain bore 3d, the first adjusting rod 3a is preferably reduced in its cross-section at least in the axial region of extension of the connecting element 3b, namely to a cross-sectionally reduced valve rod area 3h. In this preferred embodiment, the inlet funnel 3f remains free of flow barriers due to the traverses 3e arranged far from the leakage hollow space 5, and negative repercussions on the flow conditions and the flow pattern in the leakage hollow space 5 are thereby avoided.

Figure 2:
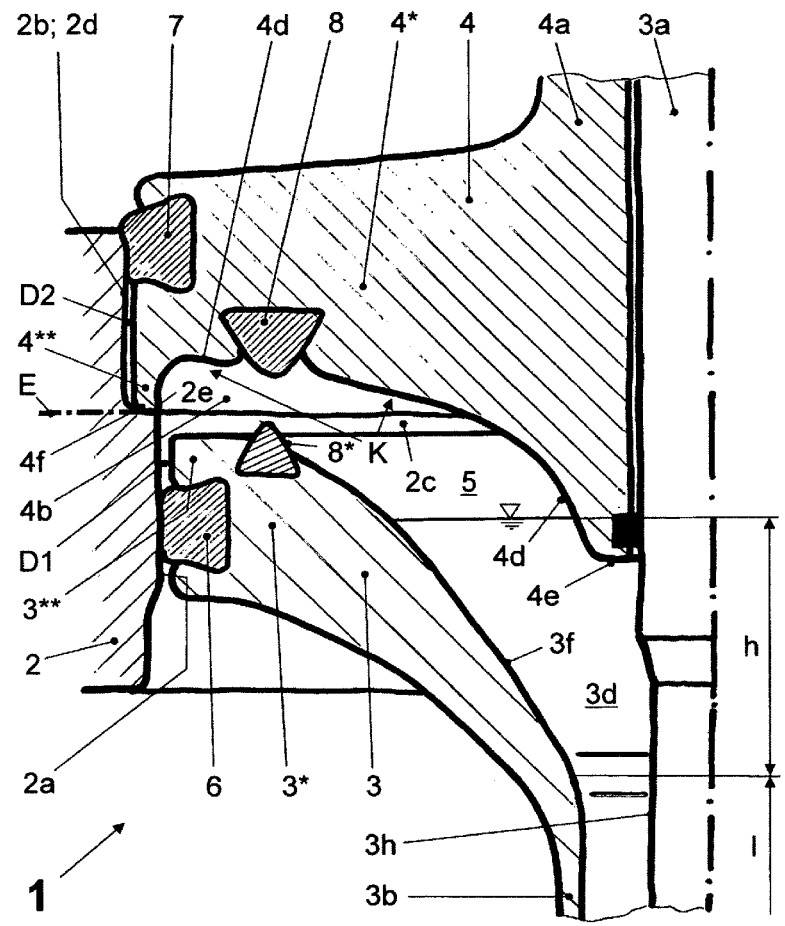
FIG. 2 is a meridian cut view of the seat region of the double-seat valve left of its longitudinal axis according to FIG. 1c, wherein the closed position of the double-seat valve is shown and an annular opening forms a perpendicular deflection angle with a transition area in a connection opening of the valve housing.
Figure 3:
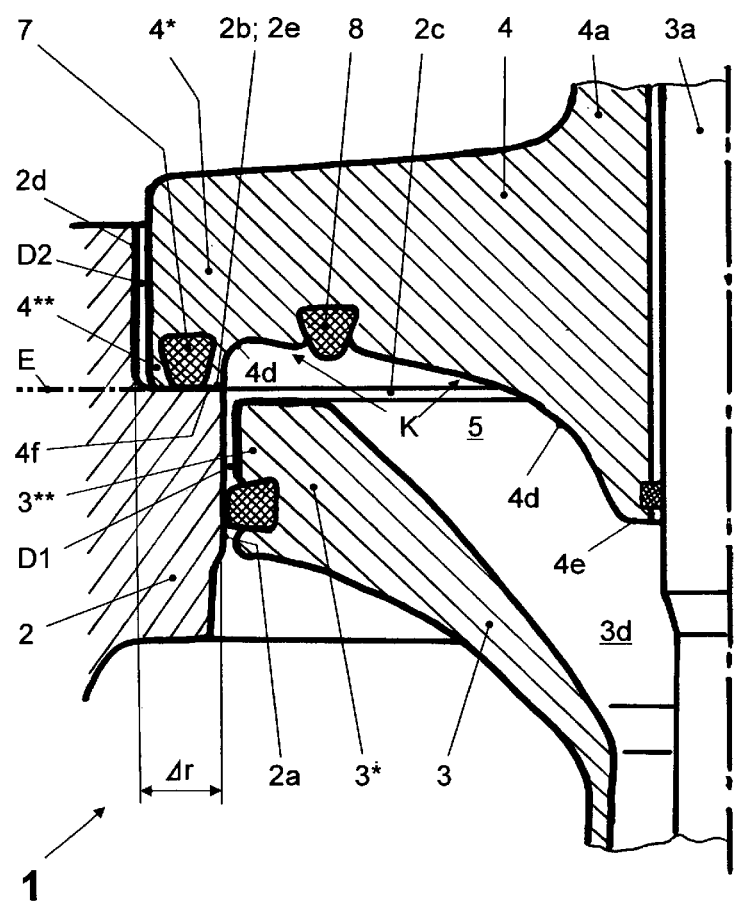
FIG. 3 is a meridian cut view of the seat region of the double-seat valve left of its longitudinal axis according to FIG. 1f, wherein the closed position of the double-seat valve is shown and an annular opening in a connection opening of the valve housing forms a perpendicular deflection angle with a transition surface and the transition surface serves as the seating for the second closing element.
Figure 4:
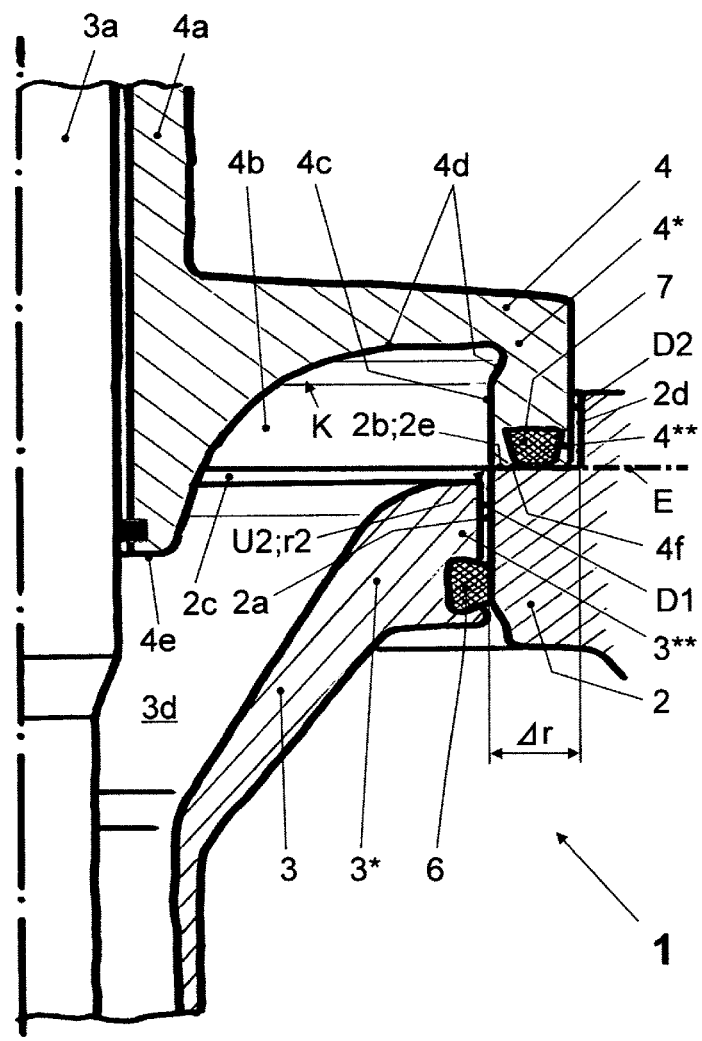
FIG. 4 is a meridian cut view of the seat region of the double-seat valve right of its longitudinal axis according to FIG. 1j, wherein the closed position of the double-seat valve is shown and an annular opening in a connection opening of the valve housing forms a perpendicular deflection angle with a transition surface and the transition surface serves as the seating for the second closing element.

Each closing element 3, 4 has on an end section 3* or 4* a cylindrical appendage 3 or 4 (FIGS. 2, 3, 4). The cylindrical appendage 3 or 4 respectively with the associated part of the connection opening 2c in the seat ring 2, in the lower area with the cylindrical first seating 2a and in the upper area with the annular opening 2d, forms an annular first restriction gap D1 or respectively an annular second restriction gap D2 (FIGS. 1c to 1k, 2, 3, 4, 6, 7).

Figure 5:
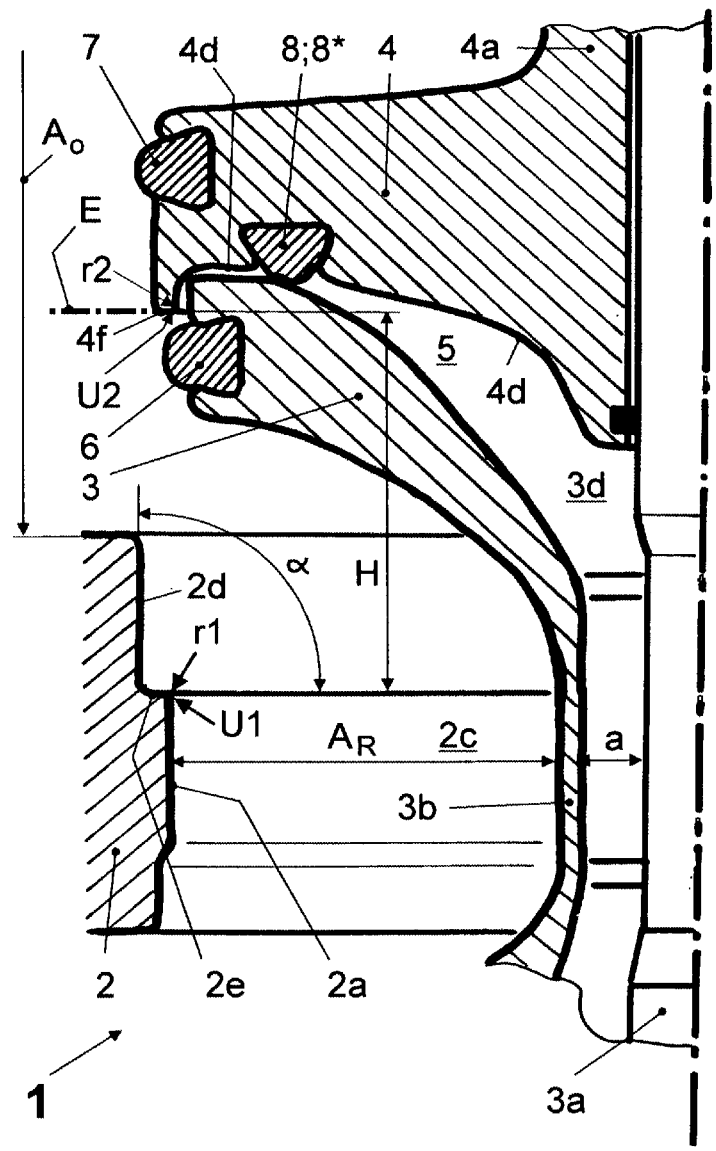
FIG. 5 is a meridian cut view of the double-seat valve according to FIG. 2, wherein the open position of the double-seat valve is shown.

FIGS. 1c to 1g clarify in connection with the related detailed representations of FIGS. 2 (according to FIG. 1c) and 3 (according to FIG. 1f) details of the basic first closing-element configuration with a middle seal 8 arranged between the two closing elements 3, 4 in the second closing element 4 or a middle seal 8* in the first closing element 3 (FIG. 2). The middle seal 8, 8* seals up the closing elements 3, 4 in their opening and closing movement and in the open position (FIG. 5).

FIGS. 1h to 1k show in connection with the related detailed representation of the FIG. 4 (according to FIG. 1j) details of the basic second closing-element configuration. This is characterized in that the second closing element 4 on its end facing the first closing element 3 has an opening 4b with a mainly cylindrical circumferential wall 4c that is flush with the cylindrical first seating 2a. This circumferential wall 4c is thereby dimensioned such that it receives in a sealing manner during the opening movement the first end section 3* and the radial first seal 6 of the first closing element 3 before the second closing element 4 opens.

FIGS. 2 to 7 illustrate details of the seat region for the double-seat valve 1 in its basic first and second closing-element configuration. In the case of the first closing-element configuration, in a preferred embodiment, the first closing element 3 forms with its cylindrical first appendage 3 (FIGS. 6, 2 from FIG. 1c), which has a first closing-element diameter $d_{1i}$, and with the associated first seating 2a of the connection opening 2c, which has a first seat diameter $d_{1a}$, the first restriction gap D1. The radial first gap width s1 is formed between the two diameters $d_{1a}$ and $d_{1i}$ on a first restriction gap length l1. The second closing element 4 with its cylindrical second appendage 4 (FIGS. 7, 2), which has a second closing-element diameter $d_2$, and with the cylindrical annular opening 2d in the connection opening 2c, which simultaneously forms the cylindrical second seating 2b with a second seat diameter $d_{2a}$, forms in the same manner the second restriction gap D2. The radial second gap width s2 is formed between the two diameters $d_{2a}$ and $d_{2i}$ on a second restriction gap length l2.

In contrast to the above, another embodiment of the basic first closing-element configuration according to FIG. 3 (from FIG. 1f) is characterized in that the transition surface 2e, which is oriented perpendicular to the longitudinal axis of the double-seat valve 1, functions as a second seating 2b and the annular opening 2d serves exclusively to form the second restriction gap D2, which, in relation to the second seal 7, is arranged on the side of this second seal 7 facing away from the leakage hollow space 5.

One embodiment of the basic second closing-element configuration according to FIG. 4 (from FIG. 1j) differs from the embodiment according to FIG. 3 in that the middle seal 8, 8* is omitted in the second closing element 4 or respectively in the first closing element 3, and the second closing element 4 on its end facing the first closing element 3 has the opening 4b with the mainly cylindrical circumferential wall 4c that is flush with the first seating 2a, wherein the latter transitions into a deflection surface 4d. This circumferential wall 4c is thereby dimensioned so that it receives in a sealing manner during the opening movement the first end section 3* and the radial first seal 6 of the first closing element 3 before the second closing element 4 opens.

Figure 7:
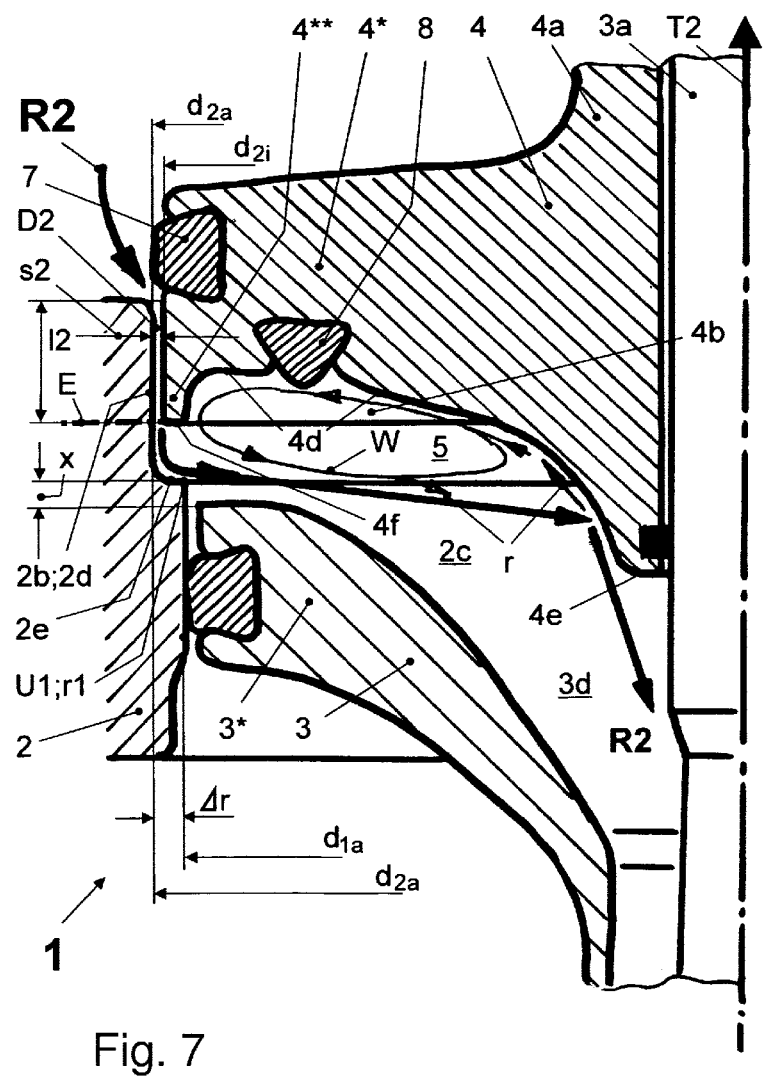
FIG. 7 is a meridian cut view of the double-seat valve according to FIG. 2, wherein the second closing element also designed as a pusher piston is located in its seat-cleaning position and the progression of the second seat-cleaning flow is shown.

Half the diameter difference between the annular opening 2d (FIGS. 3, 4, 7), which can simultaneously be the second seating 2b, and the first seating 2a forms a radial region of extension $\Delta r = (d_{2a} - d_{1a})/2$ (FIG. 7). In the latter, the transition surface 2e is provided between the first seating 2a and the annular opening 2d, wherein at least the end section of the transition surface 2e ending into the first seating 2a preferably forms a perpendicular deflection angle α (α=90 degrees) with the cylindrical circumferential surface of the annular opening 2d and thus also the cylindrical first seating 2a (FIG. 5). The annular opening 2d or respectively the second seating 2b in the connection opening 2c thereby advantageously has a rounded transition to the transition surface 2e designed with a corner radius, wherein the corner radius is designed smaller than the radial region of extension Δr. The radial region of extension Δr is designed large enough that a second seat-cleaning flow R2 (FIG. 7) exiting in the seat-cleaning position of the second closing element 4 from the second restriction gap D2 into the leakage hollow space 5 is diverted at the transition surface 2e towards the center of the leakage hollow space 5 and securely past the first closing element 3. In order to ensure that the second seat-cleaning flow R2 is not diverted prematurely in the direction of the first closing element 3, a first deflection edge U1 formed by the transition surface 2e and the first seating 2a is rounded with the smallest possible first corner rounding r1, whereby a defined flow break point is created at this point (FIGS. 5, 7).

Through the transition surface 2e itself and its special design, it is further ensured that the second seat-cleaning flow R2 exiting from the second restriction gap D2 is not directed towards the seat region of the first seal 6. Moreover, the radial region of extension Δr of the transition surface 2e must also ensure the realization of a valve-housing-side stop surface (FIGS. 2 to 7) for the second closing element 4, so that a fixed (if applicable metallic) stop of the second closing element 4 directly neighboring the leakage hollow space 5 can be realized on the seat ring 2. The valve-housing-side stop surface or respectively the corresponding section of the transition surface 2e, which directly borders the cylindrical first seating 2a, corresponds with a stop surface 4f provided on the end-face side of the cylindrical second appendage 4**. The section of the transition surface 2e functioning as the valve-housing-side stop surface and the closing-element-side stop surface 4f are preferably designed respectively straight-lined and according to the deflection angle α either preferably at a right angle or also at an obtuse angle to the longitudinal axis of the double-seat valve 1 (α≥90 degrees).

In the case of the basic first closing-element configuration (FIGS. 1c to 1g), the second closing element 4 has on its second end section 4* facing the first closing element 3 the rotationally symmetrical opening 4b (FIG. 2 from FIG. 1c; FIG. 3 from FIG. 1f), which in the closed position of the double-seat valve 1 connects on the radial outside in a manner flush with the diameter to the cylindrical first seating 2a. The opening 4b is thereby delimited by the deflection surface 4d, the contour K of which, seen in the meridian cut, has a kink-free progression, wherein the radially outer end of the deflection surface 4d ends directly in the end-face side delimitation surface of the second end section 4*, the stop surface 4f. With a region of extension facing away from its radially outer end, the deflection surface 4d delimits the remaining region of the opening 4b in its entirety, and it opens out from the second closing element at an end-face and radially inner end 4e of the second closing element 4 facing the first closing element 3. It is thereby particularly advantageous if the deflection surface 4d is guided very far radially inward and axially towards the first closing element 3, namely up to a structurally outermost possible end delimiting the second closing element 4.

For the positioning of the end-face and radially inner end 4e, which in terms of the above space-forming definition of the opening 4b should not be seen as a delimiting area of the same, the following two embodiments are suggested. The first embodiment, which is not shown in the figures of the drawing, provides that the end-face and radially inner end 4a is located within an imaginary space, which is delimited on the end-face side by a plane E passing through the stop surface 4f, or is arranged in this plane E. The end 4e does not thereby protrude over the delimitation given by the stop surface 4f or respectively plane E in the axial direction. In the case of the shown second embodiment (FIGS. 2 to 7), the end-face and radially inner end 4e of the second closing element 4, seen in the longitudinal axis of the double-seat valve 1, protrudes beyond the imaginary space, which is delimited on the end-face side by the plane E passing through the stop surface 4f. In the shown exemplary embodiments, the deflection surface 4d engages up into the entry of the drain bore 3d.

In contrast to the basic first closing-element configuration, in the case of the basic second closing-element configuration (FIGS. 1h to 1k), the radially outer end of the deflection surface 4d ends indirectly in the end-face side delimitation surface of the second end section 4* (FIG. 4 from FIG. 1j). On this radially outer outlet point from the second end section 4*, the opening 4b has the mainly cylindrical circumferential wall 4c that is flush with the cylindrical first seating 2a, which steadily, i.e., without a kink, transitions into the deflection surface 4d. The remaining characteristics of the opening 4b and its boundary according to the first closing-element configuration are transferable unrestricted to the second closing-element configuration.

A second circumferential edge U2 formed by the deflection surface 4d (FIG. 5) or the circumferential wall 4c (FIG. 4) on one side and the stop surface 4f on the other side, which is rounded with the smallest possible second corner rounding r2, is directly adjacent to the first seating 2a in the closed position of the second closing element 4 (FIGS. 2, 3, 4, 6). Seen in the meridian cut, the deflection surface 4d has the contour K with kink-free progression, wherein it preferably consists of a sequence of curved sections (e.g. arcs, ellipses, parabolas, hyperbolas), which have at their transition points respectively a common tangent. It is apparent from the direction of a first seat-cleaning flow R1 (FIG. 6) in the area of the end-face and radially inner end 4e under which directional vector the deflection surface 4d opens out from the second closing element 4, and it is further apparent that with the deflection surface 4d designed according to the invention the first seat-cleaning flow R1 is deflected in a very targeted manner and impact-free into the drain bore 3d and is forced on the longest possible flow path in the second closing element 4. A collision of the first seat-cleaning flow R1 with the areas bordering the leakage hollow space 5 does not occur at any point.

An end-face side delimitation of the first closing element 3 facing the leakage hollow space 5 has in the closed position of the latter an axial safety distance x from the transition surface 2e (FIG. 7), wherein this safety distance x avoids for one a collision of the first closing element 3 with the second seat-cleaning flow R2 and secondly ensures a sufficient ejector effect of the second seat-cleaning flow R2 in the seat region of the first closing element 3.

The seat cleaning of the double-seat valve 1 according to the invention is described below representing all embodiments of the basic first and of the second closing-element configuration according to the FIGS. 1c to 1k based on the embodiment according to FIG. 2 (according to FIG. 1c). The first seat-cleaning flow R1 exiting the first restriction gap D1 (FIGS. 6, 2, 1) after executing a first partial lift T1 in the course of the seat cleaning of the first closing element 3 first flows along the first seating 2a, bridges the contact gap between the transition surface 2e and the stop surface 4f without detaching, follows the deflection surface 4d and bridges and thereby smoothes in a flow-technical manner the middle seal 8, if it is arranged in the second closing element 4 and not like middle seal 8\* in the first closing element 3. In the further progression of the deflection surface 4*d*, the first seat-cleaning flow R1 is forced radially inward and axially to the first closing element 3 until it leaves the second closing element 4 at the end-face and radially inner end 4*e* of the second closing element 4 located preferably outside the opening 4*b* and finally makes its way directly into the inlet area of the drain bore 3*d*. The leakage-hollow-space end of the second restriction gap D2 indicated in FIGS. 2, 7 is mainly tightly sealed on the valve-housing-side stop surface 2*e* by the stop position of the second closing element 4. Cleaning liquid from the first seat-cleaning flow R1 cannot enter the second restriction gap D2 and thus into the area of the second seal 7. Even in the case of a greatly damaged or even entirely removed second seal 7, there is no longer passage for the cleaning liquid, especially since the contact gap in question is suctioned through the ejector effect of the first seat-cleaning flow R1.

If the double-seat valve 1 with a seat-cleaning function according to the invention is realized within the framework of the basic second closing-element configuration (FIGS. 1*h* to 1*k*) and if for example the embodiment according to FIG. 4 (from FIG. 1*j*) is selected, the first seat-cleaning flow R1, after it has bridged the contact gap between the transition surface 2*e* and the stop surface 4*f* without detaching, then follows the circumferential wall 4*c* and smoothes in a flow-technical manner a transition area (unlabeled undercut) in the deflection surface 4*d* serving to receive the corner area of the cylindrical first appendage **3\*\*. A small turbulence flow forming in the aforementioned transition area has no disadvantageous effects on the flow and pressure conditions in the leakage hollow space 5. The undercut shown in FIG. 4 in the aforementioned transition area can be readily forgone if a suitable rounding is performed on the first closing element 3**.

According to FIGS. 7, 1, the second closing element 4 assumes its second seat-cleaning position after executing a second partial lift T2. The second seal 7 thereby exits the second seating 2*b* under formation of an entrance gap, and the cylindrical second appendage **4\*\* forms together with the second seating 2***b* or respectively the annular opening 2*d* the second restriction gap D2, through which the second seat-cleaning flow R2 can be guided to the now overflowable, exposed second seating 2*b* and introduced into the leakage hollow space 5. The second seating 2*b* is designed cylindrically, wherein it is directly formed by the annular opening 2*d*. This embodiment ensures in a special manner that the second closing element 4 in its closed position rests with the stop surface 4*f* arranged on the end surface of its cylindrical second appendage **4\*\* alone on the transition surface 2***e*.

The second seat-cleaning flow R2 leaves the second restriction gap D2 (FIGS. 7, 2) first along the annular opening 2*d* and is deflected towards the center of the leakage hollow space 5 via the transition surface 2*e*. A direct spraying of the seat region of the first seal 6 is thereby securely prevented. The first closing element 3 is positioned at a safety distance x from the transition surface 2*e* during the seat cleaning of the second closing element 4 in the axial direction so that the second seat-cleaning flow R2 can flow unhindered over the first closing element 3. Through this flow guidance and positioning of the first closing element 3, a suctioning of the seat region of the first seal 6 is reached so that even in the case of loss or significant damage to the first seal 6, no cleaning agent can enter the neighboring first valve housing part 1*a*. The first circumferential edge U1 formed by the transition surface 2*e* and the first seating 2*a*, which is rounded with the smallest possible corner rounding r1, facilitates a detachment of the seat-cleaning flow R2 at the first circumferential edge U1 and thus prevents a stagnation-pressure-forming flow onto the annular gap leading to the first seal 6 by this seat-cleaning flow R2 or by a partial flow of the same.

FIG. 7 also shows the flow conditions that occur when the second seat-cleaning flow R2 preferably hits the deflection surface 4*d* in the area above the end-face and radially inner end 4*e* of the deflection surface 4*d* extending into the inlet of the drain bore 3*d*. In this case, the second seat-cleaning flow R2 experiences a deflection through the deflection surface 4*d* at least directed into the drain bore 3*d* and, in the case of sufficient distance between the point of impact and the end 4*e*, also a forced guidance up to far into the inlet of the drain bore 3*d*. A partial flow r directed upwards into the opening 4*b* branches off from the second seat-cleaning flow R2 at the point of impact, which forms there a turbulent flow W flowing along the deflection surface 4*d*. If the embodiment according to FIG. 4 is selected, an opposing further small turbulent flow in the undercut of the transition area between the circumferential wall 4*c* and deflection surface 4*d*. The partial flow r returned to the second seat-cleaning flow R2 is supplied from the turbulent flow W. The turbulent flow W (FIG. 7) or both turbulent flows (FIG. 4) ensures or respectively ensure sufficient cleaning of the areas bordering the opening 4*b* without leading to the formation of stagnation pressure or the direct flow onto the first seating 2*a*.

The present embodiment of the invention focuses in particular on the restriction of the respective seat-cleaning flow R1, R2. The respective volume flow of liquid of the seat-cleaning flow R1, R2 is restricted and/or deflected and guided such that the pressure on the leakage-hollow-space-side section of the seating 2*b*, 2*a* of the respective other closing element 4, 3 remaining in its closed position is equal to or less than the ambient pressure or respectively the atmospheric pressure of the double-seat valve 1. It is thereby targeted that the volume flows of liquid generated by the seat-cleaning flows R1, R2 are restricted such that the volume flows are the same. Moreover, the volume flows due to the preceding restriction are dimensioned such that they flow through the drain bore 3*d* into the surroundings of the double-seat valve 1 without backing up in the drain bore 3*d*.

However, should a backup nevertheless occur in the minimum drain cross-section a of the drain bore 3*d*, the drain bore 3*d* can then form a storage volume with a fill level h in the area of its entrance (FIG. 2), the hydrostatic pressure $\Delta p_{hydr}$ ($\Delta p_{hydr} = \rho g h$; where $\rho$ is the density of the cleaning liquid and g is gravity acceleration) of which is sufficient to convey the respective volume flow of liquid of the seat-cleaning flow R1, R2 at least through the minimum drain cross-section a, which, seen in the gravitational direction, connects to the fill level h. The storage volume with the fill level h is preferably formed by the interior of the inlet funnel 3*f*.

The first restriction gap D1 (FIG. 6) is formed by the radial first gap width s1 and the first restriction gap length l1 and the second restriction gap D2 (FIG. 7) is formed by the radial second gap width s2 and the second restriction gap length l2. A preferred design of the restriction gap D1, D2 provides that the second radial gap width s2 of the second restriction gap D2 is designed smaller than the radial first gap width s1 of the first restriction gap D1. A related quantitative measurement rule has proven advantageous according to which the relative radial gap widths of the restriction gaps D1, D2 defined below behave almost like 2:1. In this connection, it applies for the relative radial gap width of the first restriction gap D1 (FIG. 6) as per equation (1)

$$s1/[(d_{1i}+d_{1a})/2] \quad (1)$$

and for the relative radial gap width of the second restriction gap D2 (FIG. 7) as per equation (2)

$$s2/[(d_{2i}+d_{2a})/2], \quad (2)$$

wherein the restriction gap D1, D2 is preferably designed as per equation (3) with $$\frac{\frac{s1}{\frac{d_{2i}+d_{1a}}{2}}}{\frac{s2}{\frac{d_{2i}+d_{2a}}{2}}} \approx \frac{2}{1} \quad (3)$$

The respective restriction effect of the annular restriction gap D1, D2 is, besides its radial gap width s1, s2, which has an exponential effect, determined by the associated length l1, l2, which has a respectively linear impact. These parameters can be designed and coordinated under the aforementioned conditions such that the volume flows of liquid generated in the respective seat-cleaning positions with the partial lifts T1, T2 by the associated seat-cleaning flows R1, R2 are the same.

The invention claimed is:

1. A double-seat valve having a closed position and an open position, the double-seat valve comprising:
    a valve housing defining a longitudinal axis and formed of at least two valve housing parts; and
    a first closing element and a second closing element arranged in series and moveable relative to each other, which in the closed position prevent an overflow of fluid from a valve housing part of the at least two valve housing parts into another of the at least two valve housing parts, and which delimit a leakage hollow space therebetween both in the closed as well as in the open position;
    wherein the leakage hollow space is connected with the surroundings of the double-seat valve via a drain bore that is delimited by a pipe shaft connected to the first closing element led out of the valve housing;
    wherein, in the closed position, the first closing element designed as a pusher piston is received in a sealing manner in a connection opening interconnecting the at least two valve housing parts and forming a cylindrical first seating and, in a course of an opening movement in a first direction, comes to rest in a sealing manner on or in the second closing element that is assigned to a second seating, and wherein the second closing element is also transferred to the open position during the opening movement;
    wherein the second closing element is transferred into a seat-cleaning position to rinse the second seating through a second partial lift positioned in the first direction and the first closing element is transferred into a seat-cleaning position to rinse the cylindrical first seating through a first partial lift opposing the opening movement;
    wherein the first closing element has on a first end section a first seal that seals up radially with respect to the cylindrical first seating;
    wherein the second closing element has, on a second end section facing the first closing element, a rotationally symmetrical opening;
    wherein, in the closed position of the double-seat valve, the rotationally symmetrical opening connects to the cylindrical first seating on a first radial outside flush with a diameter of the cylindrical first seating;
    wherein the rotationally symmetrical opening is delimited in a radially outside part by a deflection surface, the deflection surface having a progression of a contour that changes continuously without kinks;
    wherein a radially outer end of the deflection surface ends directly or indirectly in an end-face side delimitation surface of the second end section;
    wherein each of the first end section and the second end section forms an annular restriction gap in the respective seat-cleaning position of the first closing element and the second closing element on a second radial outside with a connection opening;
    wherein the cylindrical first seating has a diameter that is smaller than a diameter of an annular opening assigned to the second closing element in the connection opening and a transition surface is between the cylindrical first seating and the annular opening;
    wherein the second closing element, in the closed position, lies with a stop surface arranged on an end surface of a second end section on the transition surface adjacent to the first seating; and
    wherein the deflection surface, with a region of extension facing away from a radially outer end, delimits a remaining region of the rotationally symmetrical opening in its entirety and ends from the second closing element at an end-face and radially inner end of the second closing element facing the first closing element, an end surface of the second closing element located outside the rotationally symmetrical opening.

2. The double-seat valve according to claim 1, wherein the end-face and radially inner end of the second closing element, seen in the longitudinal axis, protrudes beyond an imaginary space that is delimited by a plane passing through the stop surface.

3. The double-seat valve according to claim 1, wherein the first closing element, in the course of the opening movement, comes to rest in a sealing manner on the second closing element via a middle seal acting between the first closing element and the second closing element.

4. The double-seat valve according to claim 1, wherein:
    the rotationally symmetrical opening at a radially outer outlet point from the second end section has a mainly cylindrical circumferential wall that is flush with the cylindrical first seating;
    the circumferential wall transitions into the deflection surface; and
    the rotationally symmetrical opening is dimensioned in order to receive, in a sealing manner during the opening movement, the first end section and the first seal of the first closing element before the second closing element opens.

5. The double-seat valve according to claim 1, wherein:
    the second seating is cylindrical and is formed by the annular opening; and
    the second closing element has a second seal that seals off radially with respect to the second seating in sliding engagement.

6. The double-seat valve according to claim 1, wherein:
the second seating is conical and is formed by the transition surface or by a surface connecting to the annular opening on an opposite side of the transition surface; and
the second closing element has a second seal that seals off axially/radially with respect to the second seating in sliding/pressing engagement.

7. The double-seat valve according to claim 1, wherein:
the second seating is arranged perpendicular to the longitudinal axis and is formed by the transition surface or by a surface connecting to the annular opening on an opposite side of the transition surface; and
the second closing element has a second seal that seals off axially with respect to the second seating in pressing engagement.

8. The double-seat valve according to claim 1, wherein:
the at least two valve housing parts are designed according to a largest nominal passage cross-section of a pipeline which is connected thereto and are interconnected via a seat ring forming the connection opening on the inside; and
a connecting element forms a section of the drain bore on the inside and penetrates at least the connection opening during a full opening stroke of the double-seat valve, the connecting element dimensioned there on a third radial outside such that the connection opening at a narrowest point forms an annular space with an annular-space passage cross-section that is equal to or greater than a largest nominal passage cross-section.

9. The double-seat valve according to claim 8, wherein the drain bore tapers from a leakage-hollow-space-side end of the first closing element in an inlet funnel in a conical manner and continuously up to the connecting element and has in the connecting element on a restricted length a minimum drain cross-section.

10. The double-seat valve according to claim 8, wherein the drain bore expands subsequent to the connecting element in a first pressure compensating piston the pressure compensating piston having an outer diameter corresponding with the cylindrical first seating.

11. The double-seat valve according to claim 9, wherein the inlet funnel with a volume of liquid accumulating in it forms a fill level, a hydrostatic pressure of which is sufficient to convey the volume of liquid generated in the respective seat-cleaning position at least through the minimum drain cross-section of the connecting element, which connects to the fill level in a gravitational direction.

12. The double-seat valve according to claim 1, wherein a radial second gap width of the annular restriction gap formed by the second end section is smaller than a radial first gap width of the annular restriction gap formed by the first end section.

13. The double-seat valve according to claim 12, wherein the annular restriction gaps with respective radial first gap width and radial second gap width each have an associated length and are designed such that volume flows of liquid generated by associated seat-cleaning flows in the respective seat-cleaning positions with the first and second partial lifts are the same.

14. The double-seat valve according to claim 1, wherein the annular opening forms a perpendicular deflection angle with the transition surface.

15. The double-seat valve according to claim 1, wherein the contour consists of a sequence of curved sections, each of which has a common tangent at their transition points.

16. The double-seat valve according to claim 8, wherein a first connecting rod connected with the first closing element is reduced in its cross-section at least in the region of extension to a cross-sectionally reduced valve rod area.

* * * * *